Dec. 15, 1964 T. F. GUINAN 3,161,804
GROUND TESTING DEVICE
Filed Sept. 16, 1959 5 Sheets-Sheet 3

INVENTOR
THOMAS F. GUINAN
BY Paul S. Meartin
ATTORNEY

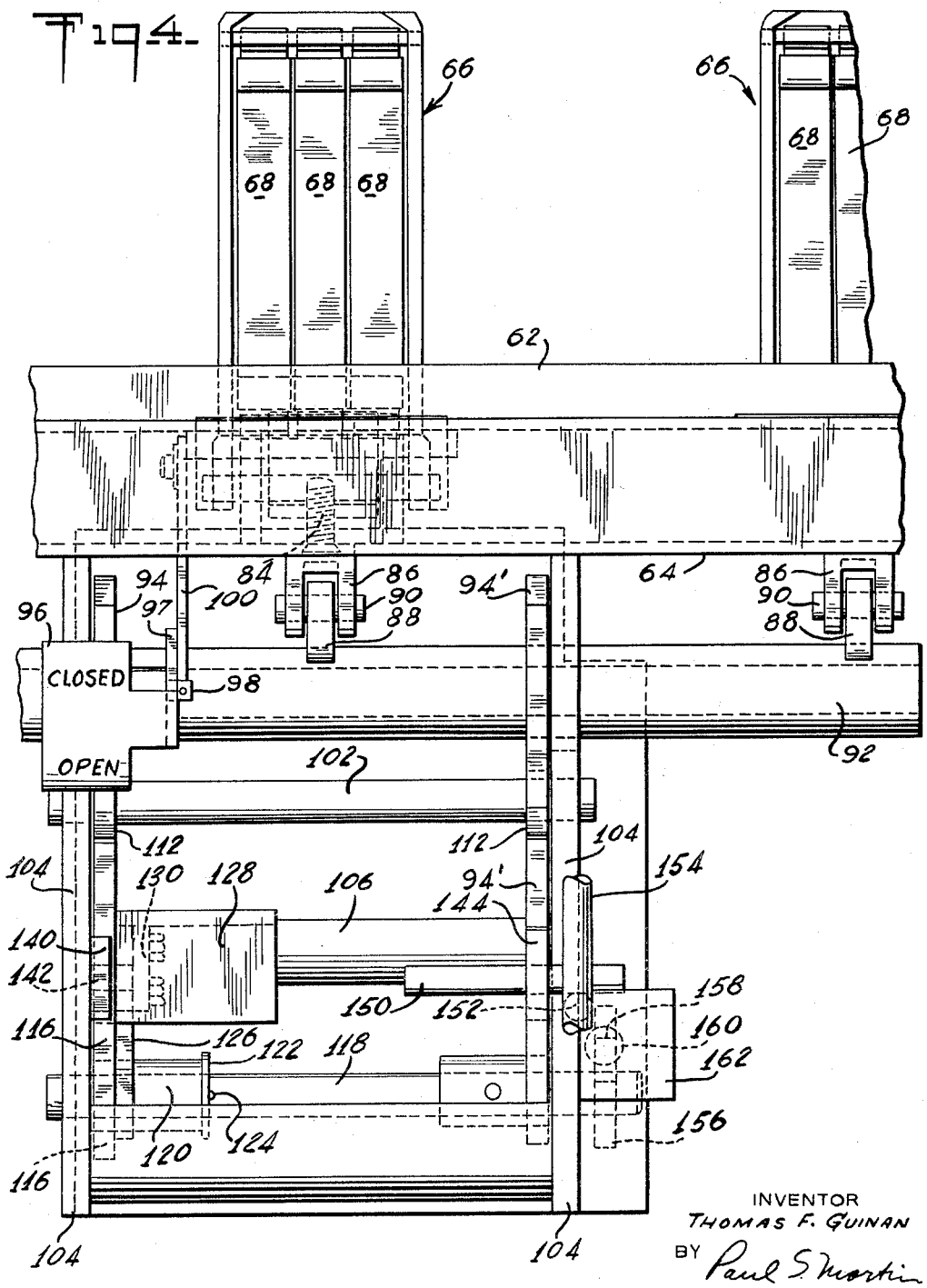

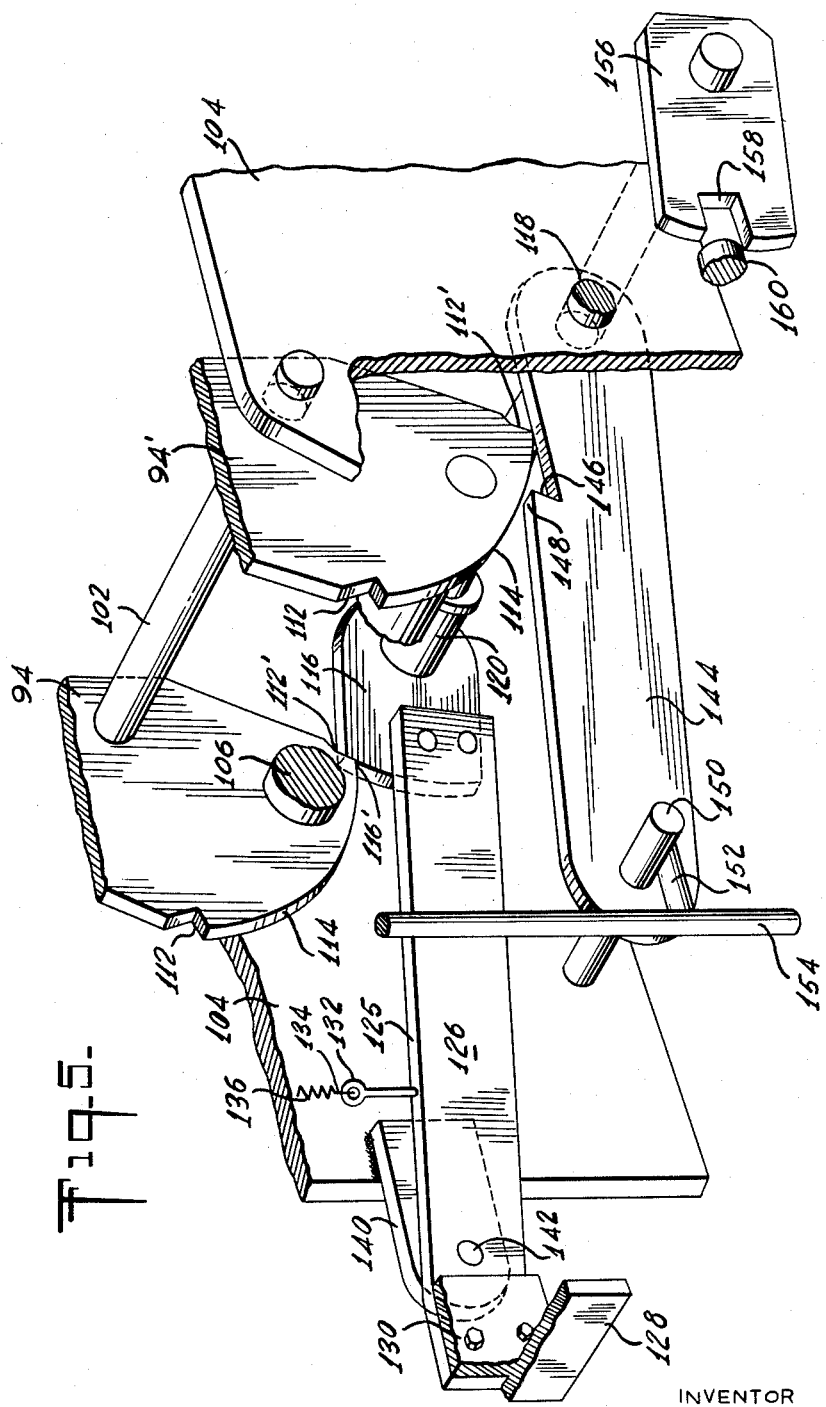

United States Patent Office 3,161,804
Patented Dec. 15, 1964

3,161,804
GROUND TESTING DEVICE
Thomas F. Guinan, Scranton, Pa., assignor to Federal
Pacific Electric Company, a corporation of Delaware
Filed Sept. 16, 1959, Ser. No. 840,369
14 Claims. (Cl. 317—99)

This invention relates generally to metalclad switchgear and, more particularly, to a ground testing device for use in metalclad switchgear housings or cubicles.

The switchgear cubicle contains contact members through which current is led into switching apparatus which is removable from the cubicle. Circuit breakers or switches companion to the cubicle may be mounted on trucks to provide for ease of insertion and removal with respect to the cubicle to thereby provide for the engagement and disengagement of a circuit breaker with the separable contact members of the switchgear cubicle. In installations of this character, it is desirable to be able to ground high-voltage electric lines to protect personnel working on such lines or associated apparatus. It is also desirable to be able to test phase out, voltages, etc. as well as selectively grounding either the bus or line circuits in the cubicle. The present invention relates to an improved ground testing device for the above stated purposes which is insertable into the cubicle in place of the removed circuit breaker.

One object of the present invention is the provision of a generally improved, safe, and foolproof ground testing device of the aforenoted character. Another object and feature of the present invention is the provision of novel, simplified and improved interlocking arrangements for grounding and testing. The ground testing device is provided with sets of shutter controlled test ports and one of such shutters is controlled by interlocking operatively linked with both the ground and selector switches so as to insure the automatic release of such shutter only when the ground switch is open and the selector switch is in a predetermined position. More particularly, such shutter is under the control of a manually reciprocable bar operatively related to both the ground and selector switches, such bar being automatically conditioned to release the shutter to uncover its companion ports on opening of the ground switch and with the selector switch in such predetermined position. With the shutter in port uncovering position the selector switch is blocked against actuation to another position and the ground switch is automatically latched open, there being additionally a Kirk interlock, or the like, to both electrically and mechanically lock the ground switch open. This arrangement thus assures safety to personnel and prevents improper operation of the ground and selector switches.

Yet another object of the present invention is the provision of a generally improved ground testing device of the aforenoted character which is of generally improved design and construction, safe and efficient, and which is eminently suitable in the accomplishment of its intended purposes.

The illustrative embodiment of the invention, which has been outlined above as incorporating certain novel features forming part of the invention, is more fully described in the remainder of this specification, from which further novel features and objects and advantages will become apparent. In the following description reference is made to the accompanying drawings forming part of this disclosure, in which drawings:

FIG. 4 is a front view of the device as shown in FIG. 3; and

FIG. 5 is an enlarged perspective view of the ground switch interlocking mechanism, the ground switch being shown closed.

Figure 1:
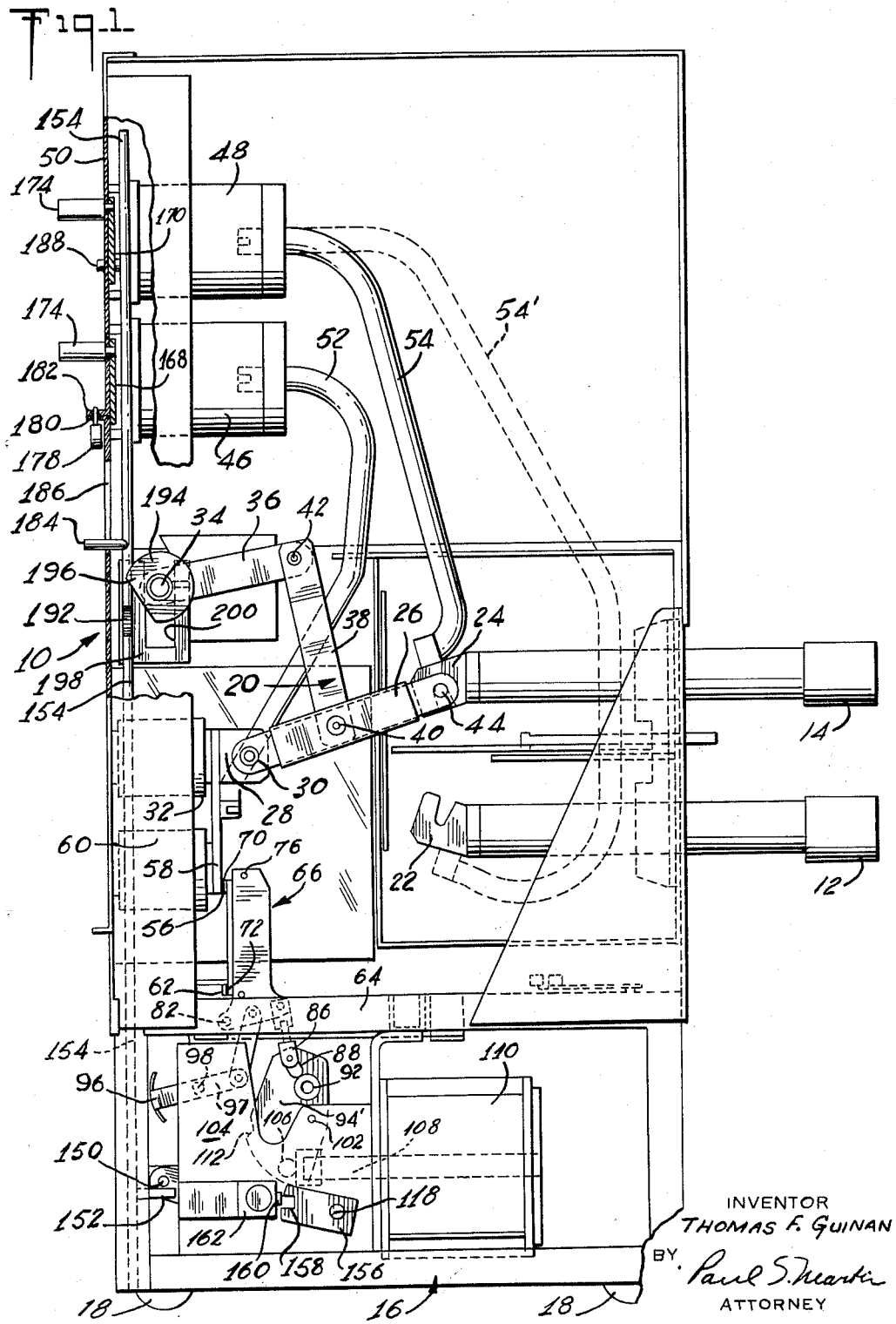
FIG. 1 is a view partly in section and partly in side elevation of a ground testing device in accordance with the present invention.

The switchgear into which the grounding device 10 of the present invention is to racked includes a series of stationary parallel contact members at one level, which may correspond to the "line" circuit, and another series of stationary contact members at another level, which may correspond to the "bus" circuit, the grounding device having series of contact members 12 and 14 at correspondingly spaced levels for engagement with companion "line" and "bus" contact members, respectively of the housing or cubicle (not shown) of said switchgear.

The ground device 10 comprises a main frame or truck 16 having wheels 18 to facilitate movement of the device, the main frame being a rigid structure formed by suitably interconnecting a series of frame members. The grounding device 10 is insertable into the cubicle of the switchgear in place of the removed circuit breaker or switch and when so inserted the contact members 12 and 14 engage their companion fixed contact members of the cubicle and accordingly are placed in circuit therewith. In the illustrated embodiment, there are three contact members 12, 14 at each level corresponding to a three-pole housing and grounding device.

In order to provide for selectively grounding either the "line" or "bus" contact members and the circuits connected therewith, there is provided in the frame a selector switch 20 of the double-throw type. The contact members 12 and 14 terminate at their inner ends in the frame in contact fittings 22 and 24, respectively which are disposed for selective engagement with the switch blades 26 hingedly mounted at 30 on supports 28. The contact fittings 22 and 24 are in circuit with their companion contact members 12 and 14, respectively and the supports 28 are mounted on insulators 32 carried by the frame. The blades of the selector switch are operated by a rotatable operating shaft 34 through linkage 36 and 38, the latter links being insulating and pivoted to the blades and links 36 at pivots 40 and 42, respectively. The shaft 34 is journalled for rotation in suitable bearings carried by the frame. The blades 26 carry pins 44 which are engageable with either the "line" or "bus" contact fittings, said pins being shown engaged with the "bus" contact fittings in FIG. 1. It will be understood that on clockwise rotation of shaft 34 (FIG. 1) the blades 26 will be actuated to engage the "line" contact fittings.

Two sets of test sockets 46 and 48 are mounted at the front plate 50 of the device for testing and phasing out of the circuits connected to the contact members. The test sockets 46 are electrically connected to the selector switch through conductors 52 and the test sockets 48 are electrically connected to the contacts 24 through conductors 54. If desired, conductors 54 may be connected to contacts 22 and contact members 12 as shown by broken lines 54' in FIG. 1.

The supports 28 are electrically connected to upper fixed contacts 56 through conductors 58 mounted on insulators 60. There is also provided lower fixed ground contacts 62 (FIGS. 1 and 3) which are connected to ground through ground bars 64, the contacts 56 and 62 being selectively placed in circuit under the control of the grounding switch 66 at each pole. Grounding switch 66 comprises spring biased bridging contact arms 68 which engage the fixed contacts 56 and 62 when the switch is closed to thereby ground the blades 26 of the selector switch and circuits connected therewith. The contact arms 68 have upper and lower contacts 70 and 72, respectively and are biased to the left viewing FIG. 3 by the compression springs 78 which are disposed between said contact arms and a fixed backing plate 80 of the switch. The contact arms 68 are provided with depending flanges 74 which are disposed to engage the pins 76 fixed to the switch which serve as limit stops for the contact arms. Thus the contact arms 68 are yieldable away from pins 76 and in the switch closed position the springs 78 are loaded and apply requisite contact pressure between the pairs of contacts 56, 70 and 62, 72. The switch is held in the closed position by a latch to be described in detail below and on manual tripping or release of the latch the springs 78 unload to provide the impetus for driving the grounding switches 66 to the open position. The grounding switch is pivoted at 82 and is provided with a push rod 84 which terminates in a forked fitting 86, there being a connecting element 88 rotatably mounted in said fitting by pin 90. Each of the elements 88 is welded or otherwise rigidly secured to a tie-bar 92 which extends through, and is welded to, the laterally spaced latch plates 94 and 94' (FIGS. 3, 4 and 5). As will be described in detail hereinafter, the latch plates are actuated by a solenoid 110 to concomitantly actuate tie-bar 92 and thereby pivot the grounding switch 66 to the latch closed position shown in FIGS. 1–3. The position of the grounding switch is indicated by the indicator plate 96 bearing "open" and "closed" indicia visible at the front of the device, said plate being carried by an arm 97 movable about pivot 98 to "open" and "closed" positions, corresponding to the position of the grounding switch, through link 100 which has its opposite ends pinned to the inner end of said arm and the bottom of the grounding switch, respectively.

With reference to FIGS. 4 and 5, the latch plates 94 and 94' are mounted on a pivot shaft 102 carried by the support plates 104 fixed to the frame, said latch plates being disposed adjacent to plates 104 inboard thereof. The latch plates are rigidly interconnected at the bottom thereof by a tie-rod 106 which is disposed to be engaged by a plunger 108 of the solenoid 110. The grounding switch is closed on energization of the solenoid 110 which through plunger 108 pivots the latch plates about pivot shaft 102 to thereby actuate tie-bar 92 and the linkage connected thereto to the switch latched position. The latch plates 94 and 94' are of identical construction for ease of manufacture and each plate is provided with latch notches 112 and 112', only one latch-notch of each plate being used. Each latch plate is provided with a cam-shaped surface 114 extending between the latch notches. The latch plates and thereby the grounding switch are maintained in a releasably closed position by the interengagement of latch member 116 in latch notch 112' of latch plate 94. More particularly, there is provided a shaft 118 rotatably carried by the support plates 104 and the latch member 116 is provided with a sleeve fitting 120 which is freely rotatable on shaft 118. The sleeve fitting 120 is restrained against displacement on shaft 118 by washer 122 and pin 124 (FIG. 4). The latch member 116 includes a latch portion 116' which engages in notch 112' of latch plate 94.

Secured to latch member 116 and extending to the front of the device is a latch bar 126 terminating in an angle fitting 128 defining a latch trip handle. The fitting 128 includes a transverse part 130 which is secured to the end of latch bar 126 in face-to-face relation therewith. Spaced inwardly from the end of bar 126 and upstanding from the top edge 125 thereof is an eye fitting 132 which is interengaged with a companion hook fitting 134 which is connected to one end of tension spring 136, the other end of the spring being fixed in the frame by pin 138.

The spring 136 is thus connected to the latch bar 126 and biases the latter up to thereby bias the latch member 116 into engagement with latch plate 94. Thus on rotation of the latch plates to close the grounding switch the latch portion 116' will engage in notch 112' of latch plate 94 to thereby latch said switch closed. The grounding switch may be tripped open, except when locked in the manner to be described, by depressing the latch bar 126 at handle 128 to disengage latch portion 116 from its companion notch. On such tripping the springs 78 will unload to drive the grounding switch open, the latch plates rotating in a counterclockwise direction, viewing FIG. 3, about shaft 102 to carry tie-bar 92 and the linkage connected thereto in said direction. Subsequent to tripping latch portion 116' will cooperate with cam surface 114 of latch plate 94 and will be conditioned for relatching said latch plate on reclosing of the grounding switch.

Fixed to plate 104 adjacent the latch bar is a locking lug 140 having an aperture which registers with the aperture 142 of the latch bar 126 in the switch closed position. The grounding switch may be externally locked in the closed position by passing a padlock through the thus registered apertures of the latch bar and lug.

Keyed to shaft 118 in the plane of latch plate 94' is a lock-out bar 144 having a latch notch 146 disposed to interengage with notch 112 of latch plate 94' in the switch open position thereof. In the switch closed position, the lock-out bar is blocked from being raised by latch plate 94', there being slight clearance between the edge 148 of the lock-out bar and the cam edge 114 of the latch plate. The outer end of the lock-out bar has a transverse pin 150 fixed thereto cooperatively associated with a projecting rod 152 fixed to the reciprocable interlock bar 154. In the switch open position, the raising of the lock-out bar provides for the interengagement of notch 146 and notch 112 of latch plate 94' to thereby latch the latter and its associated mechanism against movement to the switch closed position.

Keyed to shaft 118, outboard of support 104, is a locking lug 156 having a notch 158 disposed to register with the reciprocable plunger 160 of the key actuated lock 162, which may be of the Kirk type, in the switch open position, the plunger being out of registry with notch 158 in the switch closed position, as shown in FIG. 3. The lock 162 is electrically in series with the switch closing solenoid 110 so that in the switch open position, the switch may be both electrically and mechanically locked in such position by actuation of the lock, the latter being fixed to the frame.

Test plugs may be inserted into the test sockets 46 and 48 through the test ports 164 and 166, respectively at the front of the grounding device when the shutters 168 and 170, respectively are actuated to port uncovering position. The shutters are suitably guided for sliding movement at the rear of the plate 50 between test port covering position, as shown in FIG. 2, and test port uncovering position in which the shutter ports 172 register with their companion ports 164, 166. Manual reciprocation of the shutters is achieved through handles 174 which are fixed to said shutters and project through elongated horizontal openings 176 provided in plate 50, the extent of the openings 176 determining the range of movement of the shutters. The shutter 168 may be locked closed (FIG. 2) by means of a padlock 178 which is received in the registering apertures of locking lugs 180 and 182 fixed to plate 50 and shutter 168, respectively. Once padlock 178 is removed, the shutter 168 is freed for manual reciprocation.

Pursuant to the present invention, the shutter 170 is controlled by interlocking operatively linked with both the ground and selector switches so as to insure the automatic release of such shutter only when the ground switch is open and the selector switch is in a predetermined position, the "line" position of the illustrated embodiment, this arrangement insuring against false phasing out test by having the same potential at both test sockets 46 and 48 and preventing ground switch closing during phasing out when grounding is not desired. The shutter is under the control of the manually reciprocable bar 154 which is vertically disposed and suitably guided at the rear side of plate 50. The bar 154 is provided with a handle piece 184 which projects through a vertical elongated slot 186 provided in the plate 50, the handle piece providing for reciprocation of the bar. The bar is provided with a rod or latching element 188 which projects through registering vertical slots 190 provided in the shutter and plate. Element 188, in the down position as shown in FIGS. 1 and 2, blocks the shutter 170 from opening, and on the release of the bar, the latter may be raised to lift element 188 to the broken line position 188' as shown in FIG. 2 beyond the shutter thereby freeing the latter for opening.

Figure 2:
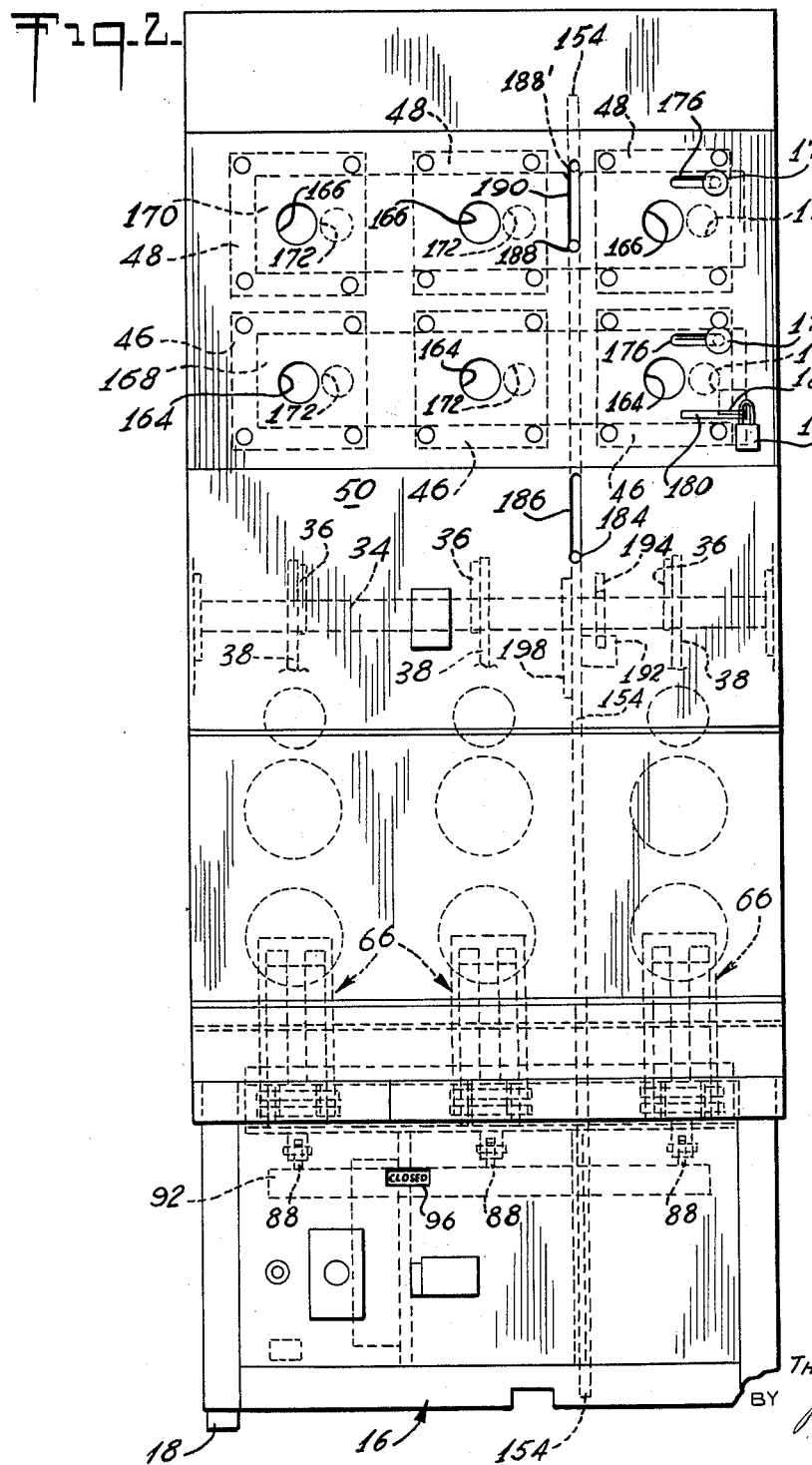
FIG. 2 is a front view thereof, the bus test port shutter being shown interlocked and the line test port shutter being shown padlocked.
Figure 3:
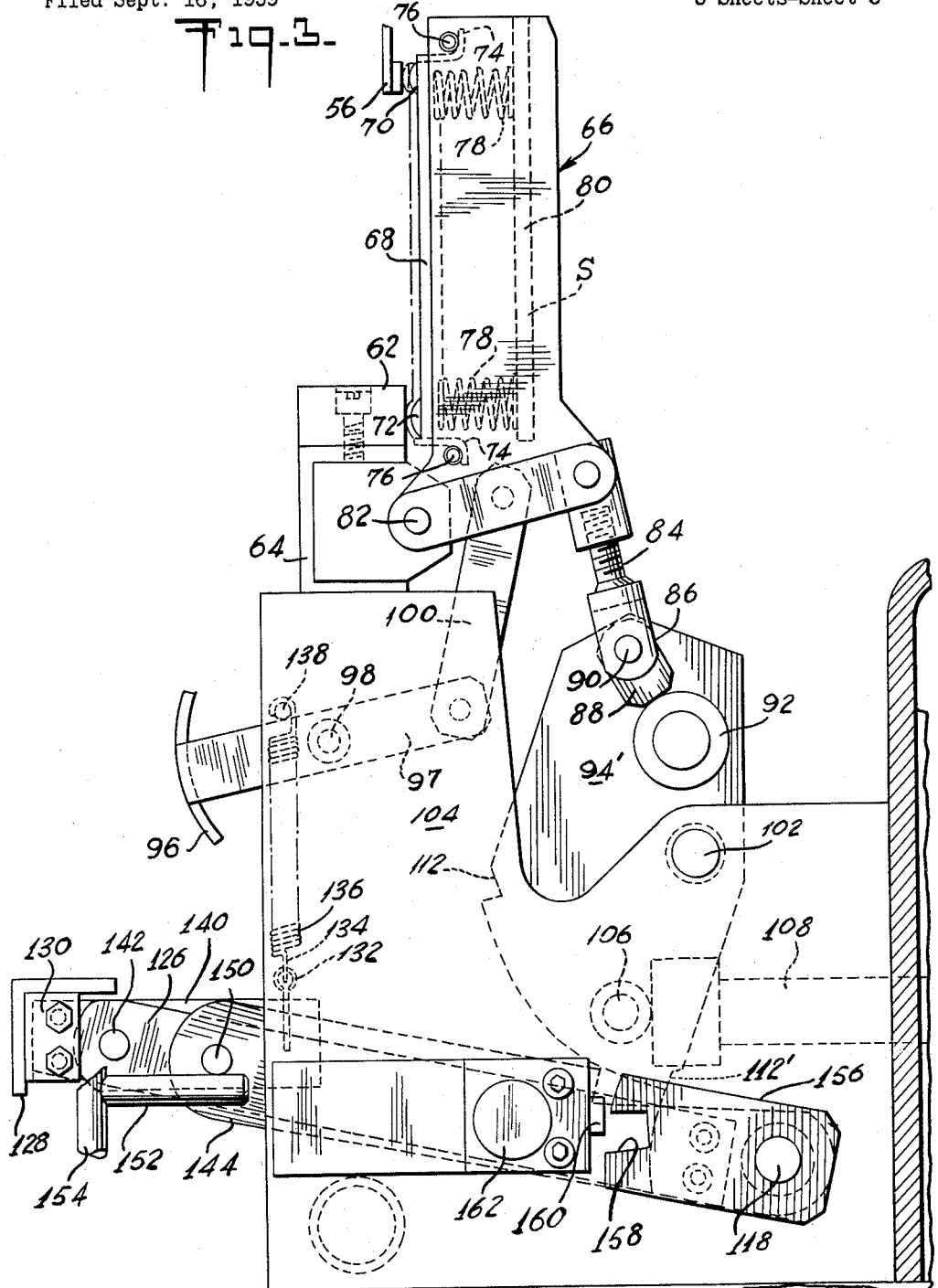
FIG. 3 is an enlarged fragmentary side elevational view of the lower part of the ground testing device, the ground switch being closed.

The bar is provided with a laterally projecting lug 192 which is operatively associated with the cam plate 194 fixed to the shaft 34 of the selector switch (FIGS. 1 and 2). In the "bus" position of the selector switch as shown in FIG. 1, the portion 196 of cam plate 194 projects into the path of movement of lug 192 to prevent the bar from being raised. When the selector switch is actuated to the "line" position, the cam plate 194 will be rotated out of the path of movement of lug 192 so that the bar may be raised, assuming the ground switch is open. With the bar raised for opening the shutter 170, the selector switch is blocked against movement to the "bus" position by the lug 192 which will be in the raised position and in the path of movement of the cam plate 194. To insure against the bar bypassing the cam plate on the application of undue stress, there is provided a yoke 198 fixed to the bar having an elongated opening 200 to receive shaft 34 with slight lateral clearance. On reciprocation of the bar the yoke reciprocates with respect to the shaft 34 and this cooperation provides strong reinforcement to prevent bypass of the bar with respect to the cam plate. In order to raise the lift bar 154, the ground switch must be open as the pin 150 is in the path of movement of the rod 152 of said bar. In the switch closed position, the lock-out bar and its pin 150 are blocked from being raised by latch plate 94'. Thus the shutter control bar 154 is interlocked with both the selector and ground switches and said bar may be raised to unlatch the shutter only if the selector switch is in a predetermined position ("line" position) and the ground switch is open. The raising of the bar automatically functions to latch the ground switch open through the cooperation of notches 112 and 146 and optionally the switch may be both electrically and mechanically locked open by means of key lock 162. With the shutter 170 open or in port uncovering position, the selector switch is blocked against actuation to another position and the ground switch is automatically latched open.

From the above it will be apparent that there is provided a simplified and improved interlocking arrangement for grounding and testing which assures safety to personnel and prevents improper operation of the ground and selector switches.

Various additional modifications of the above embodiments of the invention will readily occur to those skilled in the art, and therefore the invention should be broadly construed in accordance with its full spirit and scope.

Having thus described my invention what I claim as new and desire to secure by Letters Patent is:

1. In a ground testing device for insertion into a companion cell, a frame structure having a plurality of contact members, a selector switch operable to engage a selected one of said contact members, a plurality of test sockets having test ports mounted in said structure, one of said sockets being electrically connected to one of said contact members and another one of said sockets being electrically connected to said selector switch, one of said test sockets having a shutter for controlling the opening and closing of the test port thereof, a grounding switch mounted in said structure and adapted for electrical connection to said selector switch for grounding a selected contact member, and mechanical interlocking means for said shutter operatively connected to and extending between said grounding and selector switches, said interlocking means conditioning said shutter for release to open said test port in predetermined positions only of said grounding and selector switches.

2. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and interlocking means extending between said shutter and said switches and mechanically coupling one of said shutters with said grounding and selector switches, said interlocking means conditioning said one shutter for release to open the test ports thereof in predetermined positions only of said grounding and selector switches.

3. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and interlocking means extending between and mechanically coupling one of said shutters with said grounding and selector switches, said interlocking means conditioning said one shutter for release to open the test ports thereof in predetermined positions only of said grounding and selector switches, said interlock means comprising an interlock device movable between shutter-blocking and shutter-releasing positions, said interlock device being released for movement to said shutter-releasing position in said predetermined positions of said grounding and selector switches, said interlock device in said shutter-releasing position blocking the movement of said switches out of said predetermined positions.

4. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and interlocking means extending between and mechanically coupling one of said shutters with said grounding and selector switches, said interlocking means conditioning said one shutter for release to open the test ports thereof in predetermined positions only of said grounding and selector switches, said grounding switch predetermined position being the open position thereof and said selector switch predetermined position being a position in engagement with the series of contact members free of electrical connection with said test sockets.

5. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters extending between said shutter and said switches and movable between shutter-blocking and shutter-releasing positions, said grounding and selector switches having means coupled therewith disposed in the path of movement of said interlock device to block movement thereof to said shutter-releasing position, said blocking means releasing said interlock device for movement to said shutter-releasing position in the open position of said grounding switch and in a predetermined position of said selector switch.

6. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters extending between said shutter and said switches and movable between shutter-blocking and shutter-releasing positions, said grounding and selector switches having interlock parts coupled therewith cooperatively associated with companion interlock parts of said interlock device to block the movement of the latter to said shutter-releasing position except when said grounding switch is open and said selector switch is in a predetermined position.

7. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters extending between said shutter and said switches and movable between shutter-blocking and shutter-releasing positions, said grounding and selector switches having interlock parts coupled therewith cooperatively associated with companion interlock parts of said interlock device to block the movement of the latter to said shutter-releasing position except when said grounding switch is open and said selector switch is in a predetermined position, said selector switch having operating mechanism and said interlock part thereof being operated by said mechanism into and out of the path of movement of said companion interlock part of said interlock device, said selector switch interlock part and its companion interlock part of said interlock device in the shutter-releasing position thereof blocking the movement of said selector switch out of said predetermined position.

8. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters movable between shutter-blocking and shutter-releasing positions, said interlock device extending between said shutter and said switches, said grounding and selector switches having interlock parts coupled therewith cooperatively associated with companion interlock parts of said interlock device to block the movement of the latter to said shutter-releasing position except when said grounding switch is open and said selector switch is in a predetermined position, said grounding switch having operating mechanism therefor including means for releasably latching the same in closed position, and means for locking said latching means and grounding switch in closed position.

9. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters extending between said shutter and said switches and movable between shutter-blocking and shutter-releasing positions, said grounding and selector switches each having interlock parts coupled therewith cooperatively associated with companion interlock parts of said interlock device to block the movement of the latter to said shutter-releasing position except when said grounding switch is open and said selector switch is in a predetermined position, operating mechanism for said grounding switch, interlocking mechanism including said grounding switch interlock part blocking the movement of said interlock device to shutter-releasing position in the closed position of said grounding switch, said interlocking mechanism automatically latching said operating mechanism in the open position in the shutter-releasing position of said interlock device.

10. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and an interlock device for one of said shutters extending between said shutter and said switches and movable between shutter-blocking and shutter-releasing positions, said grounding and selector switches each having interlock parts coupled therewith cooperatively associated with companion interlock parts of said interlock device to block the movement of the latter to said shutter-releasing position except when said grounding switch is open and said selector switch is in a predetermined position, operating mechanism for said grounding switch, interlocking mechanism including said grounding switch interlock part blocking the movement of said interlock device to shutter-releasing position in the closed position of said grounding switch, said interlocking mechanism automatically latching said operating mechanism in the open position in the shutter-releasing position of said interlock device, and a key-operated lock for locking said interlocking mechanism in said automatic latching position.

11. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and a reciprocable interlock member for one of said shutters extending between said shutter and said switches and movable between shutter-blocking and shutter-releasing positions, said interlock member and selector switch having cooperating interlock parts relatively movable between interlock member-blocking and interblock member-releasing positions, said interlock parts being in the latter position in a predetermined position of said selector switch and in the former position in another position of said selector switch, operating mechanism for said grounding switch, interlocking mechanism for said operating mechanism including an interlock part cooperatively related to a companion interlock part of said interlock member, said interlocking mechanism blocking the movement of said interlock member to shutter-releasing position in the closed position of said grounding switch through cooperation of said last mentioned interlock parts, and said interlocking mechanism automatically latching said operating mechanism in the open position through the cooperation of said last mentioned interlock parts on the reciprocation of said interlock member to the shutter-releasing position.

12. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and a reciprocable interlock member for one of said shutters extending between said shutter and said switches and movable between shutter-blocking and shutter-releasing positions, said interlock member and selector switch having cooperating interlock parts relatively movable between interlock member-blocking and interlock member-releasing positions, said interlock parts being in the latter position in a predetermined position of said selector switch and in the former position in another position of said selector switch, operating mechanism for said grounding switch, interlocking mechanism for said operating mechanism including an interlock part cooperatively related to a companion interlock part of said interlock member, said interlocking mechanism blocking the movement of said interlock member to shutter-releasing position in the closed position of said grounding switch through cooperation of said last mentioned interlock parts, and said interlocking mechanism automatically latching said operating mechanism in the open position through the cooperation of said last mentioned interlock parts on the reciprocation of said interlock member to the shutter-releasing position, and a key-operated lock for locking said interlocking mechanism in said operating mechanism latching position.

13. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of the test ports thereof, a grounding switch mounted in said structure and adapted for electrical connection to said selector switch for grounding a selected series of contact members, and interlocking means extending between and mechanically coupling one of said shutters with said grounding and selector switches, said interlocking means blocking the movement of said grounding and selector switches from one position to another when said shutter is in the open test port position, said interlocking means comprising an interlock device movable between switch blocking and switch releasing positions, said interlock device being released for movement to said switch releasing position in the test port closed position of said shutter, said interlock device in said switch releasing position blocking the movement of said shutter out of said test port closed position.

14. In a ground testing device, a frame structure having two series of contact members, a selector switch operable to engage a selected series of contact members, two series of test sockets having test ports mounted in said structure, said two series of test sockets being electrically connected to a selected series of contact members and said selector switch, respectively, each series of test sockets having a shutter for controlling the opening and closing of a test port thereof, a grounding switch mounted in said structure and adapted for electrical connection to said selector switch for grounding a selected series of contact members, and an interlock device for said switches movable between switch blocking and switch releasing positions and extending between one of said shutters and said switches, said shutter having a portion disposed in the path movement of said interlock device in the shutter open position to prevent the movement of said device to said switch releasing position, said shutter freeing said interlock device for movement to said switch releasing position in the closed position of said shutter.

References Cited in the file of this patent
UNITED STATES PATENTS

| | | |
|---|---|---|
| 1,935,448 | Huber | Nov. 14, 1933 |
| 2,363,364 | Rugg | Nov. 21, 1944 |
| 2,735,042 | Hayford | Feb. 14, 1956 |
| 2,921,998 | Pokorny | Jan. 19, 1960 |